March 19, 1968  P. R. SUNDBY  3,373,609
SYSTEM FOR MEASURING THE HEIGHT OF THE LIQUID LEVEL IN TANKS
Filed July 19, 1965  2 Sheets-Sheet 1
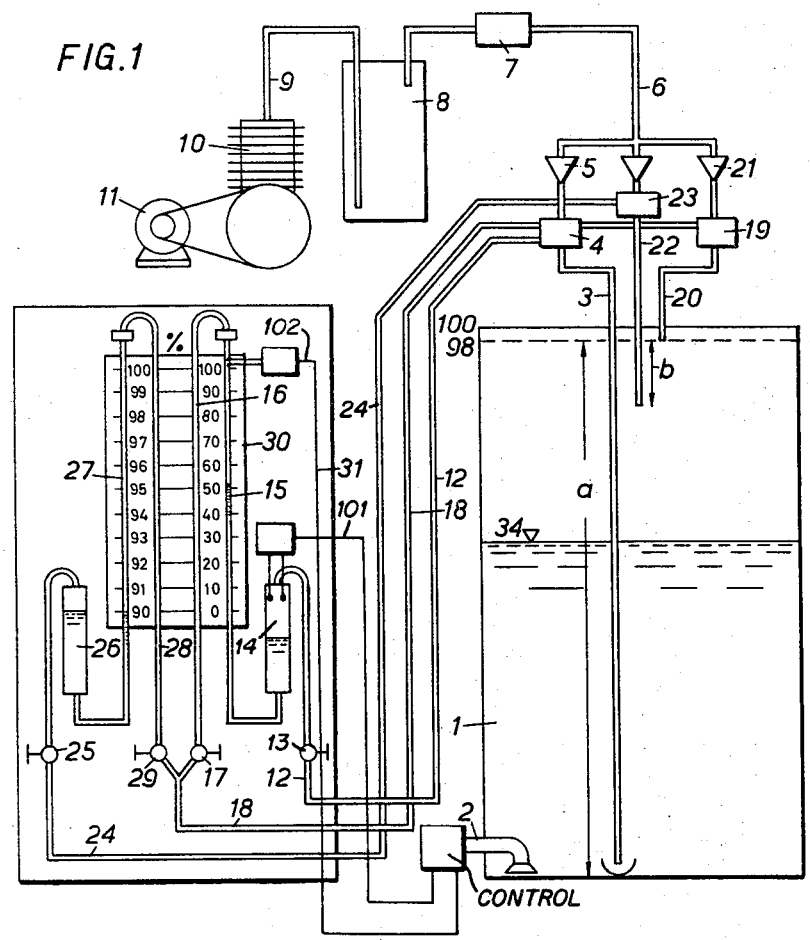
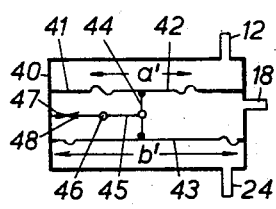
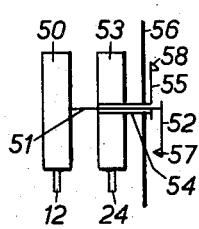
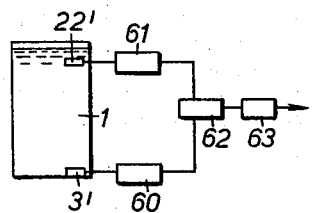
Inventor
Per Robrt Sundby
Stevens, Davis, Miller & Mosher
Attorneys

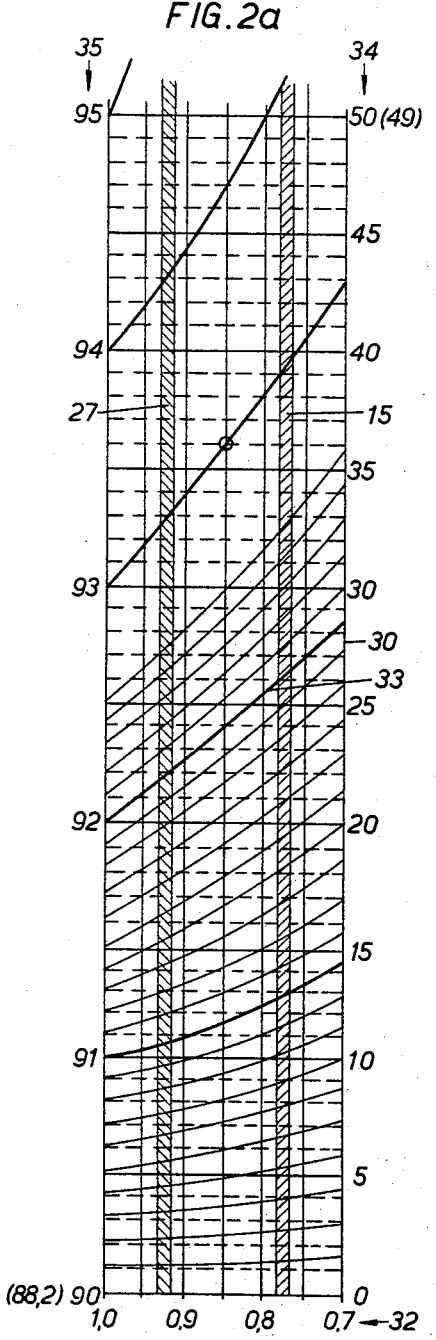
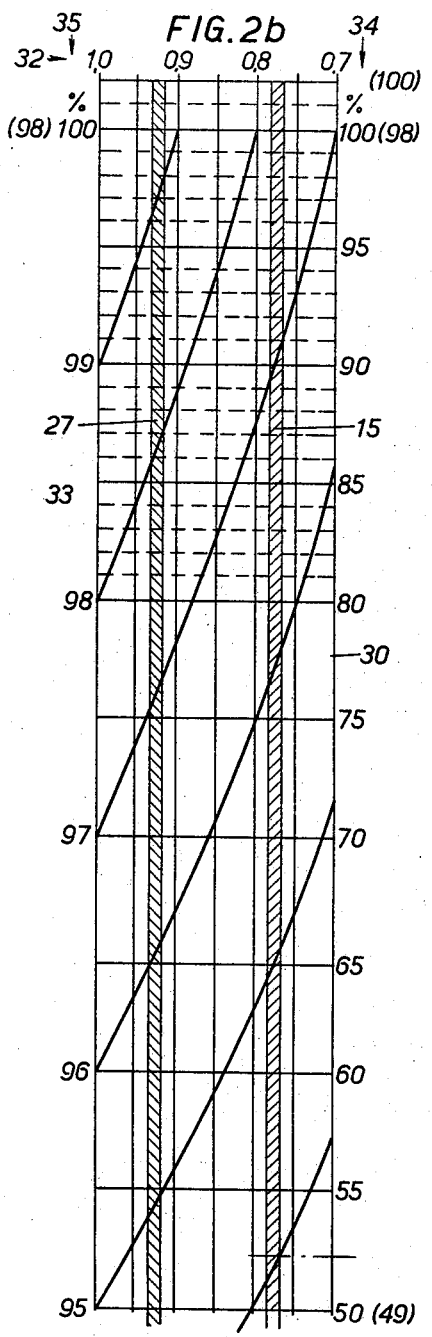
FIG. 2a
FIG. 2b

| United States Patent Office | 3,373,609
Patented Mar. 19, 1968 |
|---|---|

3,373,609
SYSTEM FOR MEASURING THE HEIGHT OF THE LIQUID LEVEL IN TANKS
Per Rohrt Sundby, Midtåsen 52, Ljan, Oslo, Norway
Filed July 19, 1965, Ser. No. 472,839
Claims priority, application Norway, July 22, 1964, 154,101; Sept. 14, 1964, 154,749
9 Claims. (Cl. 73—299)

ABSTRACT OF THE DISCLOSURE

An apparatus for measuring the height of the liquid level and consequently the liquid quantity in a tank, said apparatus comprising a first and second pressure sensitive means located at varying levels in the tank, as well as a liquid manometer means responsive to each of said pressure sensitive means, and located outside said tank. The ratio of the specific gravities of the liquids in the manometer means, and therefore the deflections of each of said manometer means in response to a given change in height of the liquid level in said tank, are equal to the ratio between the vertical distances of the respective pressure sensitive means from the highest desired liquid level in the tank.

---

Especially on filling, but also on discharging tanks, especially in tankers, it is necessary to watch over the filling and discharging operation continually and to have at the same time an accurate specification of the contents of the tank or the quantity filled or discharged. For this purpose a known method is to equip the tanks with a pressure sensitive means, such as a measuring pipe which goes from the top of the tank down to the bottom, and another pressure sensitive means such as a further measuring pipe which goes a distance down in the tank, hitherto usually 2 m. These pipes are kept free from the liquid in the tank, as they are connected up with a pressure gas source, such as a small compressor and pressure tank, which continually supplies a small amount of gas, such that with small time intervals bubbles, such as air bubbles, will come out of the tubes. The pipes are furthermore connected with each manometer, in most cases a liquid manometer, of which that one which is connected with the pipe which leads to the bottom of the tanks, is, in order that it shall not be too long, usually filled with mercury, whereas the other manometer is filled with a lighter liquid, such as water for example. It is obvious that the latter manometer will only begin to show a difference in pressure when the liquid in the tanks reaches up to the bottom end of the short pipe.

As a pressure sensitive means, one may use closed capsules which have resilient walls, such as concentrically corrugated walls similar to the aneroid capsule barometer. Said capsules are arranged in the desired height within the tank, one immediately above the tank bottom and the other such as 2 m. below the tank top. Said capsules are via tubes connected with respective manometers, as described above.

The pressure sensitive means may also consist of electrical reactances, the reactance value of which vary with the pressure to which the same are subjected. Reactances of this kind are also termed pressductors. The pressure registering instruments are in such case electrical measuring instruments.

The pneumatic measuring systems of the nature as described above have first and foremost the disadvantage that the two manometer scales are of a totally deviating nature as regards the grading. The manometer that operates with water or another lighter liquid as a measuring medium, is made relatively high, usually just as high as the other manometer which is filled with the heavy liquid, such as mercury, without any interplay between the two manometers or their scales.

The object of the invention is to obtain a simple and expedient system for measuring the height of the liquid level, and thus the liquid content in tanks by measuring the liquid pressure at the tank bottom for rough reading of the total liquid content and measuring of the liquid pressure on one or more higher levels for fine reading of the liquid level in the upper part of the tank, by means of pressure sensitive means, the pressure influence on which may be directly or indirectly read by means of pressure registering means located outside the tank. The novelty of the invention is that the relation between the specific deflections of the pressure sensitive means is equal to the relation between the vertical distances of the pressure sensitive means from the highest level of liquid in the tank. When manometers are used as pressure sensitive means, it may be, by appropriate choice of said relation, that scales for the said manometers have corresponding grading. This is especially true when the ratio chosen is 1:10. Consequently, if liquid manometers are used and the heavy measuring liquid is mercury, a liquid is chosen as the lighter measuring liquid having a specific gravity of 1:10 of the specific gravity of mercury, i.e. 1.36. The two scales are at the same time graded in percent.

In the latter case it will only be the top tenth of the tank that has both rough and fine reading. However, in many cases it is desirable that a larger part of the contents of the tank can be read both by rough and fine readings. The system according to the invention can also be applied in this case, as the metering pipe for fine reading is extended downwardly in known manner with a desired number of pipe sections each of which have the same length as the mentioned metering pipe and which are in the same relation to the length of the metering pipe for rough reading, as the first-mentioned short metering pipe. The individual sections are arranged after each other and at the connecting points valves are inserted which are opened and closed in their proper turn, in such a way that the pipe section above commences to function as a fine registering metering pipe when the liquid in the tank passes a connecting point and the relevant valve is influenced. The same manometer is thus used for each metering pipe section in turn.

The manometers may be equipped with electric or magnetic or optical signallers which can control the filling or discharging pumps of the tank respectively the above-mentioned connecting and disconnecting of the measuring sections for the fine reading.

If pressure sensitive reactances (pressductors) are used as pressure sensitive means, same may serve directly to control the pumps of the tank.

The invention shall be further explained with reference to the drawing, in which:

FIG. 1 shows diagrammatically a tank plant with measuring equipment.

FIGS. 2a and 2b on a diminished scale the bottom and top half respectively of a joint measuring scale for the two manometers.

FIG. 3 shows schematically a section of a differential manometer.

FIG. 4 shows two manometers with concentrically arranged pointer axles, and

FIG. 5 shows schematically an electric operating circuit.

In FIG. 1, 1 shows a tank that has through a side wall, near the bottom led into it filling and discharging pipes or draining pipe 2 as well as three thin pipes 3, 20 and 22. Of these the pipe 3 is led down to the bottom of the tank and constitutes part of the measuring system for rough reading of the level of the liquid in the tank. The pipe 3 is connected over a branching 4 with a joint gas supply pipe 6 which is connected across a pressure reduction valve 7 with a gas container 8 which is through pipe 9 supplied with gas, for example air, from a compressor 10 which is operated by an electric motor 11. The branch of the pipe 6 which leads to the branching 4, contains a oneway valve 5 which only lets gas through in the given direction. The pipe 3 is also connected across the branching 4 with a pipe 12 that leads to a panel 31 which is placed in a central measuring and control room, for example onboard a tanker, and which is connected across a cock 13 with the one side of a U-shaped pipe 14, 15 which contains a supply of a heavy liquid, such as mercury. The level of the liquid 34 in the tank is given by the difference in level between the liquid meniscuses in the two branches 14, 15. The branch 15 of the U-pipe is in the usual way connected across a pipe 16 and a valve 17 with a pipe 18. This is in turn connected across a branching 19 with the pipe 20, and with the higher branch of the pipe 6 which also contains a one-way valve 21. Through these connections the liquid meniscuses in the branch 15 is exposed to the same pressure that exists at the top of the tank, so that possible differences in pressure between the top space in the tank and the atmosphere are compensated for. The scale 30 that lies behind the branch 15 of the U-pipe, is graded from 0 to 100, that is to say in percent.

The tanks in tankers are usually filled up to 98 percent, which level on the scale 30 has been chosen as 100 percent in order to simplify the control when watching over the filling and discharging operations.

In the same way as with the long pipe 3, the short pipe 22 is connected across a branching 23 with a branch of the pipe 6 and with a pipe 24. This is connected across a valve 25 with the one branch 26 of a U-shaped measuring pipe 26, 27 which is located in front of the left part of the scale 30, and in the same way as the branch 15, it is across a pipe 28 and a cock 29 as well as the pipes 18 and 20 in connection with the space at the top of the tank 1. The left side of the scale 30 is graded 90 to 100.

The U-pipe 26, 27 contains the light measuring liquid, in the present case such a liquid, the specific gravity of which is in the same relation to the specific gravity of the liquid in the U-pipe 14, 15, as the ratio $b:a$, that is to say the relation between the two pipe lengths from the 98 percent level in the tank. As mercury has a specific gravity of 13.6 and provided that the ratio $b:a$ is 1:10 a measuring liquid is used in the U-pipe 26, 27 having a specific gravity of 1.36. A very simple scale is thereby achieved, as the scale lines are the same for both the manometer pipes' scales, apart from the fact that the relation between the scales is 1:10. During filling of the tank the manometer 14, 15 will act alone as long as the bottom nine tenths of the tank are being filled. When this level is reached, manometer 26, 27 will also commence to operate, and its column of liquid will rise ten times as fast as the column of liquid in the pipe branch 15. At the moment the two liquid meniscuses have reached the same height, the tank is full, that is to say that the liquid has reached the chosen level, in the present case 98 percent. This applies no matter what the specific gravity is of the liquid in the tank. Thus, if the specific gravity of the liquid is 0.7 the meniscuses of the two manometers will be at the same level when they register 70 and 97 percent respectively. Conversely it is possible to read off the specfic gravity of the liquid in the tank, as the grading on the mercury manometer gives this specific gravity with an accuracy of two decimals.

In FIGS. 2a and 2b the scale 30 is shown in detail.

Besides the graduation of 0–100 on the right side and 90–100 on the left side shown in FIG. 1, the scale has a course of curves for the current specific gravities. In the present case, which presupposes that the tank is to be used for different distillations of crude oil, the scale is marked with the specific gravities 0.7–1.0 in stages of 0.05. The course of curves 33 is drawn up for each whole percent of graduation on the right hand side and each tenth percent of graduation on the left hand side. If the right manometer branch 15 shows 30 percent on the scale 34 and the liquid in the tank has a specific gravity of 0.85, the point of intersection between the curve section that runs upwards from left to right from the level 30 percent and the vertical line for 0.85, shows the actual volumetric quantity of liquid in the tank, that is to say in the chosen case 36 percent, as marked by a small circle.

The scale 35 applies to the manometer pipe 27 which serves for fine reading of the contents in the upper tenth of the tank. The course of curves also applies to this scale. Thus, if the manometer 27 shows 93 percent and the liquid in the tank has a specific gravity of 0.85, the curve line which starts at the left at 93 percent is followed in the same way as explained. The contents of the tank is then in this case 93.6 percent.

For clearness the top half of the scale in FIG. 2b also shows the actual percentage quantity of liquid in the tank, that is to say in relation to the entire tank volume. These actual values 98 and 100 percent and some others have been placed in brackets at the top and bottom of both scale halves.

As already mentioned the system may also be used to obtain a fine reading of the contents in the lower parts of the tank. In that case the metering pipe 22 which co-operates with manometer 27, is extended in known manner further below the 90 percent level with the same length as many times as an extension of the fine reading is desired. This extended pipe is then, also as known, divided up with valves into equally long sections which are then in the same relation to the long metering pipe 3 as $b:a$, or 1:10 in the embodiment chosen. The valves serve to open the pipe wall at the points between the sections and will in that way cause manometer 27 to be applied again for each section. The opening and closing of the valves can take place automatically controlled direct by the pressure of the tank liquid at the relevant place by means of floats (not shown), or by impulses from the control room for example. When the liquid in the tank has reached the next section, the left manometer will show 100 percent and the right manometer 15 for rough reading will show the actual value in percent. On reading both the manometers the accurate contents of the tank can be decided with great accuracy. As the liquid in the left manometer reaches the mark that corresponds to 100 percent for the specific gravity of the relevant tank liquid, the valve is opened that opens the measuring pipe at the dividing point between two sections, so that the liquid in the manometer pipe 27 again sinks down to the 90 percent scale mark and from there begins to wander up the same scale. During discharging of the tank the opposite takes place. Opening and shutting of the mentioned valves can also take place by way of remote control, for example from the control room by pneumatic means. Similar arrangements may be made for automatic control of the filling and discharging operations such as shown by the circuit 101 and 102 connecting the branches of manometer 14, 15 with a control which permits filling or discharge of the liquid into or from the tank 1 from a pump or the like. Signallers for remote control must, of course, be adjusted in accordance with the specific gravity of the liquid in the tank.

When measuring by pneumatic means is used, the pressure sensitive means described above being constituted by measuring pipes which are led down into the tank, and which besides being connected with each manometer, are connected with a pressure gas source which during measuring keeps the pipes filled with gas, or consisting of capsules which are also connected with each manometer, said two manometers may be combined to form a differential manometer, whose deflective element is devised to close a control circuit when the relationship between the two pressures is equal to the relationship ($n$:1) between the distances of the two sensitive means from the desired level of liquid in the tank. However, the two manometers may also be needle instruments, whose pointer axles are arranged concentrically and whose maximum deflections (range of measurement) are in the mentioned relationship ($n$:1) to each other and thus take the same position on maximum deflection, in which position an electric operating circuit is closed across the two pointers as the pointers are equipped with interacting contacts.

If the pressure-sensitive devices are of an electric nature, that is to say inductive, capacitive or ohmic, each of the two pressure-sensitive devices may be coupled with each their electric amplifier, whose amplifying ratios correspond to the mentioned ratio ($n$:1) and whose outlets are compared in a comparative circuit which operates an operating circuit for the liquid pump.

According to FIG. 3 the three measuring pipes 12, 18 and 24 which are shown in FIG. 1 are connected with a differential manometer which consists of a closed container 40 which is divided into three reciprocally separated compartments by means of two membranes 42 and 43, of which the first 42 is inserted in an opening in a partition 41. The relationship between the area $b':a'$ of the two membranes is the same as the ratio $n$:1, that is to say the ratio $a:b$ in FIG. 1, preferably 10:1. The centre points of the two membranes are connected with each other by means of a rigid joint 44 which is in the middle flexibly coupled to a lever 45 which is pivotably suspended at a fixed point 46. The free end of the lever carries an electric contact 48 that interacts with an electric contact 47 which is fixed on the inside of the wall of the housing 40.

The gas pressure in the two pipes 12 and 24 will influence each their membranes 42 and 43 respectively, and when these pressures are in the same relationship to each other as the relationship between the membrane areas, the lever 45 will take the centre position shown in FIG. 1 and will close an operating circuit which is connected with the two contacts 47 and 48 and causes the pump that is used on filling the tank to stop. The level of the liquid in the tank will then be 98 percent, see FIG. 1.

According to FIG. 4 the two pipes 12 and 24 are connected with each their manometers 50 and 53 respectively, whose pointer axles 51 and 54 respectively are arranged concentrically, in the present case by means of the latter axle being hollow and the first-mentioned axle passing through this. The two pointers 52 and 55 respectively have a common scale 56 and are equipped with electric contacts 57 and 58 respectively which are closed when both manometers show maximum deflection. The relationship between the manometers' deflection is $n$:1, preferably 10:1. The effect would be the same as described in connection with FIG. 3. Also in this case arrangements can be made for a compensation for possible excess pressure or low pressure in the tank, as the closed housing of the two manometers are connected with the pipe 18.

According to FIG. 5 the pressure-sensitive elements 3' and 22' consist of electrical reactances (inductive, capacitive or ohmic resistances) the values of which vary in accordance with the pressure applied from outside and serve as a measure for said pressure. The two reactances are connected with each their elastic amplifier 60 and 61 respectively, whose amplifying relationship are in the relationship of 1:$n$, expediently 1:10.

When the liquid has reached the level 98 percent, see FIG. 1, the two amplifiers' outlets will be the same. The outlets are given a comparative circuit 62 which is connected with an operating circuit 63.

At the same outlet from the amplifiers 60 and 61 the difference that occurs in the circuit 62 will be 0, which is applied as an operating criterion for the operating circuit 63 for disconnection of the liquid pump during filling of the tank.

I claim:
1. An apparatus for measuring the height of the liquid level and consequently the liquid quantity in a tank, said apparatus comprising a first pressure sensitive means at the bottom of the tank and sensitive to the total liquid quantity in said tank, a second pressure sensitive means in said tank at a higher level than that of said first pressure sensitive means, said second pressure sensitive means being sensitive to the liquid quantity above said higher level, and a liquid manometer means responsive to each of said pressure sensitive means, and located outside said tank, the ratio of the specific gravities of the liquids in the manometer means and therefore the deflections of each of said manometer means in response to a given change in height of the liquid level in said tank being equal to the ratio between the vertical distances of the respective pressure sensitive means from the highest desired liquid level in the tank.

2. An apparatus as claimed in claim 1, wherein said manometer means have the same maximum deflection.

3. An apparatus as claimed in claim 1, wherein said ratio is equal to 10:1.

4. An apparatus as claimed in claim 1, wherein at least one of said manometer means is provide with signaling means adapted to control operating electrical circuits upon said manometers reaching a predetermined deflection.

5. An apparatus as claimed in claim 1, wherein the scales of said manometer means are marked with courses of curves giving the specific gravity of the liquid contained in the tank.

6. An apparatus as claimed in claim 1, wherein said manometer means each have pointer means, and further comprising an electrical contact provided on each of said pointer means, said contacts adapted to close an electric operating circuit upon reaching a predetermined deflection.

7. An apparatus for measuring the height of the liquid level and consequently the liquid quantity in a tank, said apparatus comprising a first pressure sensitive means at the bottom of the tank and sensitive to the total liquid quantity in said tank, a second pressure sensitive means in said tank at a higher level than that of said first pressure sensitive means, said second pressure sensitive means being sensitive to the liquid quantity above said higher level, differential manometer means responsive to each of said pressure sensitive means, and located outside said tank, said differential manometer means having two interconnected membranes, the pressure output of each pressure sensitive means being applied to a side of a different membrane, the ratio of the areas of said membranes being inversely equal to the ratio between the vertical distances of the respective pressure sensitive means from the highest desired liquid level in the tank and means responsive to the combined movement of said membranes.

8. The apparatus of claim 7, in which said responsive means comprises electrical contact means coupled to the deflective members of said differential manometer, said electrical contact means being adapted to close an electrical circuit upon said deflective members reaching a predetermined position.

9. An apparatus for measuring the height of the liquid level and consequently the liquid quantity in a tank, said apparatus comprising a first pressure sensitive reactance at the bottom of the tank and sensitive to the total liquid quantity in said tank, a second pressure sensitive reactance in said tank at a higher level than that of said first pressure sensitive means, said second pressure sensitive reactance being sensitive to the liquid quantity above said higher level, an electric amplifying means responsive to each of said pressure sensitive means and located outside said tank, the amplifying ratios of said amplifying means being inversely equal to the ratio between the vertical distances of the respective pressure sensitive means from the highest desired liquid level in the tank, and a comparative electrical circuit connected to the output of said amplifying means and adapted to operate an electrical circuit when the outputs of the two amplifiers means are the same.

References Cited
UNITED STATES PATENTS

| | | | |
|---|---|---|---|
| 1,421,739 | 7/1922 | Stancliffe | 73—302 X |
| 2,559,936 | 7/1951 | Isserstedt | 73—302 |
| 2,692,501 | 10/1954 | Erwood | 73—299 |
| 2,948,116 | 8/1960 | Olander | 92—49 X |
| 3,054,292 | 9/1962 | Vandoni | 73—299 |

LOUIS R. PRINCE, *Primary Examiner.*

DAVID SCHONBERG, *Examiner.*

WILLIAM HENRY II, *Assistant Examiner.*